United States Patent

Dodgson

[15] 3,651,881

[45] Mar. 28, 1972

[54] BUMPER GUARD FOR SNOWMOBILES

[72] Inventor: Leonard S. Dodgson, 220 First Avenue North, Jamestown, N. Dak. 58401

[22] Filed: May 8, 1970

[21] Appl. No.: 35,791

[52] U.S. Cl. ............................................. 180/5 R, 280/26
[51] Int. Cl. ..................................................... B62m 27/02
[58] Field of Search ..................... 280/26, 25, 15, 104.5 A; 180/5 R; 267/21, 30, 139, 140, 141

[56] References Cited

UNITED STATES PATENTS 1,499,299    6/1924    Hatosy et al. .............................. 280/25

*Primary Examiner*—Benjamin Hersh
*Assistant Examiner*—Robert R. Song
*Attorney*—Robert L. Harrington

[57] ABSTRACT

A protective bumper mounted over the rearward end of the skis of a snowmobile to prevent the trailing end of the skis from hitting the bottom of the snowmobile body.

3 Claims, 2 Drawing Figures

PATENTED MAR 28 1972 3,651,881

INVENTOR
LEONARD S. DODGSON

BY Robert L. Harrington
ATTORNEY

BUMPER GUARD FOR SNOWMOBILES

HISTORY

Snowmobiles are conventionally constructed with at least one ski that supports the front end of the vehicle. This ski is mounted for pivotal movement in a horizontal plane for steering. It is furthermore spring mounted to absorb shocks and otherwise conform to the terrain. Whereas the snowmobile is primarily used in sports it is most commonly used in rough terrain where hills and valleys are encountered continuously. It will be understood that when the front end of the ski drops down the back end is tipped up. Depending on the suddenness of the down slope and the speed of the snowmobile this tipping up of the read end of the ski is severe enough to cause the back end or trailing end of the ski to hit the bottom of the vehicle.

Snowmobiles have become extremely popular over the last 10 years or so and presently there are dozens of snowmobile manufacturers building and selling thousands of snowmobiles each year. In every snowmobile known to applicant the occurrence of the objectionable hitting of the ski on the bottom of the vehicle body is common. Not only is the banging of the ski against the solid vehicle body noisy and uncomfortable to the riders, it is also damaging both to the vehicle body and the ski. Yet even though this condition has been known for many years none of the snowmobiles known to applicant have been designed to obviate this condition.

BRIEF HISTORY

Figure 1:
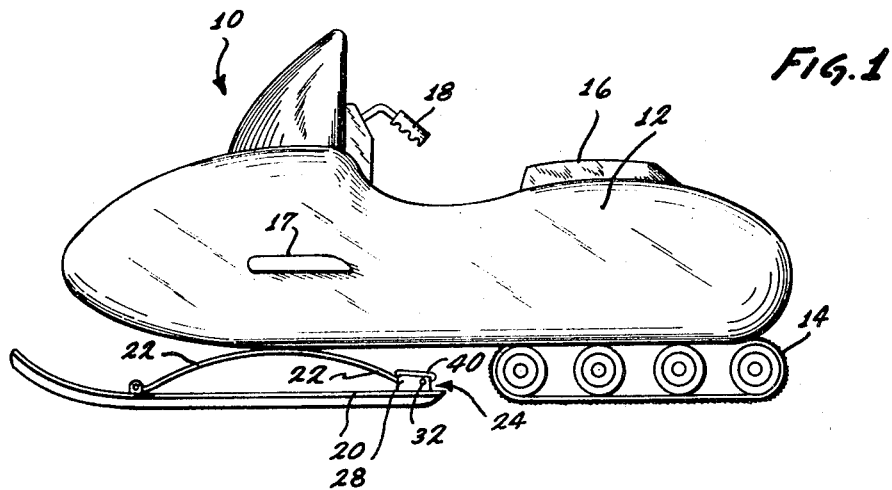
Figure 2:
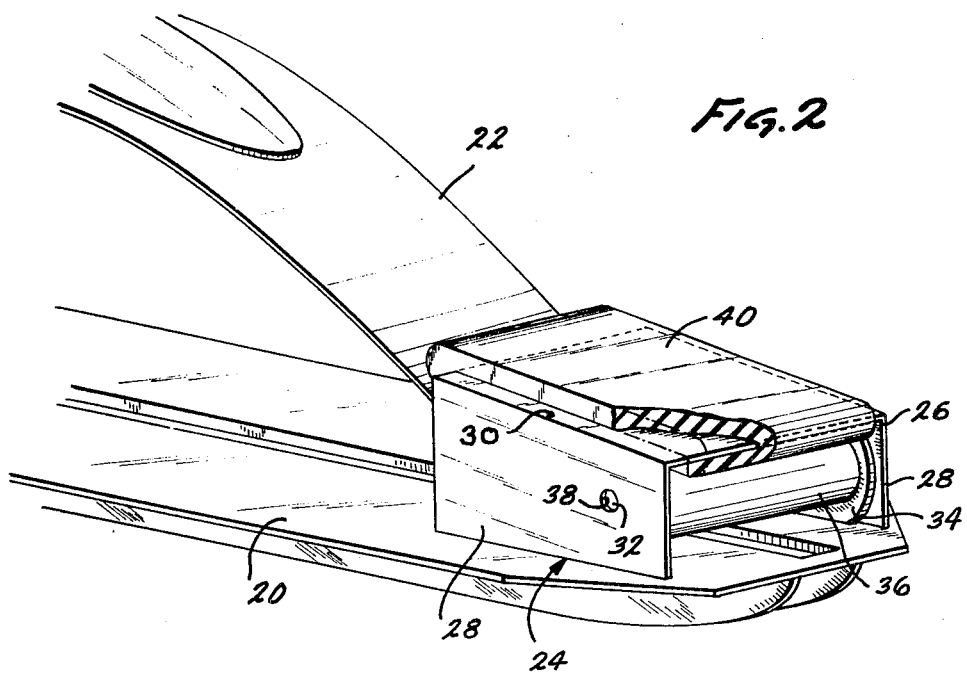

The present invention provides a novel yet simple and inexpensive solution to the problem. Briefly the preferred embodiment of my invention includes a guard that is mounted over the trailing end of the ski in a manner whereby no additional fasteners are required and without interferring with the normal operation of the ski and its mounting. The invention and its advantages will be further understood by reference to the following detailed explanation and drawings wherein;

FIG. 1 is a perspective view of a typical snowmobile utilizing the present invention; and FIG. 2 is an enlarged view of the section of the skis and supporting means with the bumper guard of the invention affixed thereto, a portion of which is broken away for purposes of illustration.

Referring to FIG. 1 of the drawing, a typical snowmobile 10 includes a body 12 which houses a motor (not shown) for powering the drive system represented by the endless track 14 at the rear end of the body 12. A seat 16 with foot rest 17 supports a rider who maneuvers the vehicle by controlled turning of the handle bar 18. The handle bar is connected through a linkage to a ski 20 that is mounted by leaf springs 22 to the bottom of the body 12.

The structure generally described above is a common type vehicle often referred to as a snowmobile. However the illustrated snowmobile is characterized from the snowmobile commonly known to the industry by reason of the bumper guard 24 attached to the trailing end of the ski 20.

Referring more specifically to FIG. 2 of the drawings, the bumper guard as will be noted is constructed from a U-shaped bracket 26. The leg portions 28 of the bracket 26 have a straight bottom edge and tappered top edges. The bottom edge abuts the top surface of the ski 20. The connecting portion 30 connects the top edges of the leg portions and forms an inclined top plate 31. As shown the leaf spring 22 is connected to the ski 20 by a pin 32 which is inserted through ear portions 34 on each side of the ski 20 and a crimped portion 36 formed in the end of the leaf spring 22.

With the U-shaped bracket flush on the ski 20, holes 38 on the leg portion 28 are aligned with the pin 32. The pin 32 is thus pushed through the leg portions and properly fastened. The inclined top plate thereby covers the interconnection assembly and extends backward over a portion of the leaf spring 22 but leaving sufficient clearance for proper operation of the leaf spring as shown. An elastomeric pad 40 is molded to the top plate 30.

In operation the U-shaped bracket and absorbent pad are spaced above the pivotal connection of the spring and ski and do not interfere with the normal running of the snowmobile. Also the U-shaped bracket is both simple in construction and easily attached to the ski without altering in the slightest way any part of the original structure (except where necessary to replace the original pin 32 with a longer pin). Yet when the severe tipping of the ski occurs as previously described the pad 40 absorbs the full impact without noise, jarring or damage.

Persons skilled in the art will be able to conceive of numerous variations of the above described embodiment which is presented herein for purposes of illustration only. The scope of the invention is determined by the appended claims.

What I claim is:

1. A snowmobile having a body, a drive system for driving the snowmobile and a steering mechanism comprising a ski, a leaf spring connected at each end to the ski, and means for pivotally connecting the leaf spring intermediate its ends to the body in a manner whereby at least one end of the spring and ski connected thereto is normally positioned under the body and pivots about said pivotal connection against the body, the improvement which comprises a bumper guard having support means connected to one of the ski and spring, a bumper pad, and said support means being comprised of an inverted U-shaped bracket having a pair of legs and a cross piece, a cushioning pad affixed to the cross piece, the legs of the bracket straddling the spring, and a pin connecting the legs under the spring and securing the bracket at the end of the spring thereby supporting the bumper pad in a position over the connection between the end of the spring and ski normally positioned under the body to absorb the impact of the spring and ski pivoted against the body.

2. A snowmobile as defined in claim 1 wherein the spring is connected to the ski and the legs of the bracket are connected by a common connecting pin.

3. A snowmobile comprising; a body, a drive system, and a steering mechanism, said steering mechanism including a ski, a leaf spring connected at each end to the ski, and means for pivotally connecting the leaf spring intermediate its ends to the body in a manner whereby at least one end portion of the spring and ski connected thereto is normally positioned under the body and pivots about said pivotal connection against the body, the improvement which comprises a bumper guard to absorb the impact of the spring and ski pivoted against the body, said bumper guard including an inverted U-shaped bracket, a cushioning pad affixed to the top of the cross piece of the inverted U-shaped bracket, and fastening means fastening the legs of the inverted U-shaped bracket to one of the ski and spring to position the pad above said end portion of the spring and ski connected thereto and normally positioned under the body and pivoting thereagainst.

* * * * *